Jan. 22, 1957 W. J. WACHTER 2,778,219
IMPACT TESTER FOR BRITTLE MATERIALS
Filed Dec. 15, 1954 2 Sheets-Sheet 1

INVENTOR
WILLIAM J. WACHTER

BY
ATTORNEYS

INVENTOR
WILLIAM J. WACHTER

United States Patent Office 2,778,219
Patented Jan. 22, 1957

2,778,219

IMPACT TESTER FOR BRITTLE MATERIALS

William J. Wachter, Euclid, Ohio

Application December 15, 1954, Serial No. 475,592

5 Claims. (Cl. 73—12)

(Granted under Title 35, U. S. Code (1952), sec. 266)

The invention described herein may be manufactured and used by or for the Government of the United States of America for governmental purposes without the payment of any royalties thereon or therefor.

This invention relates to an impact tester for measuring impact strength of brittle materials.

Impact testers are in common use where impact strength is measured by striking the specimen with a pendulum or fly wheel and determining the energy of impact. In determining the impact energy by these testers, the specimen bar is notched and struck by a swinging pendulum at a striking velocity of around 11.0 to 17.0 feet per second. The toss energy, that is, the energy absorbed in throwing the fragment broken by impact, must then be calculated and deducted from the total energy of specimen fracture to obtain the actual impact strength. Failure to calculate toss energy with adequate precision has heretofore been an important factor in diminishing tester accuracy; and the invention herein disclosed presents satisfactory arrangements for overcoming this difficulty.

A main object involved, therefore, is the provision of an impact tester by means of which the determination of the actual impact force necessary to fracture may easily be made. An object also is to provide tester mechanism with which the toss energy is readily determinable. Still another object is to provide functional and structural simplification over the prior art apparatus.

Other objects and many of the attendant advantages of this invention will be readily appreciated as the same becomes better understood by reference to the following detailed description when considered in connection with the accompanying drawings wherein.

Figure 1:
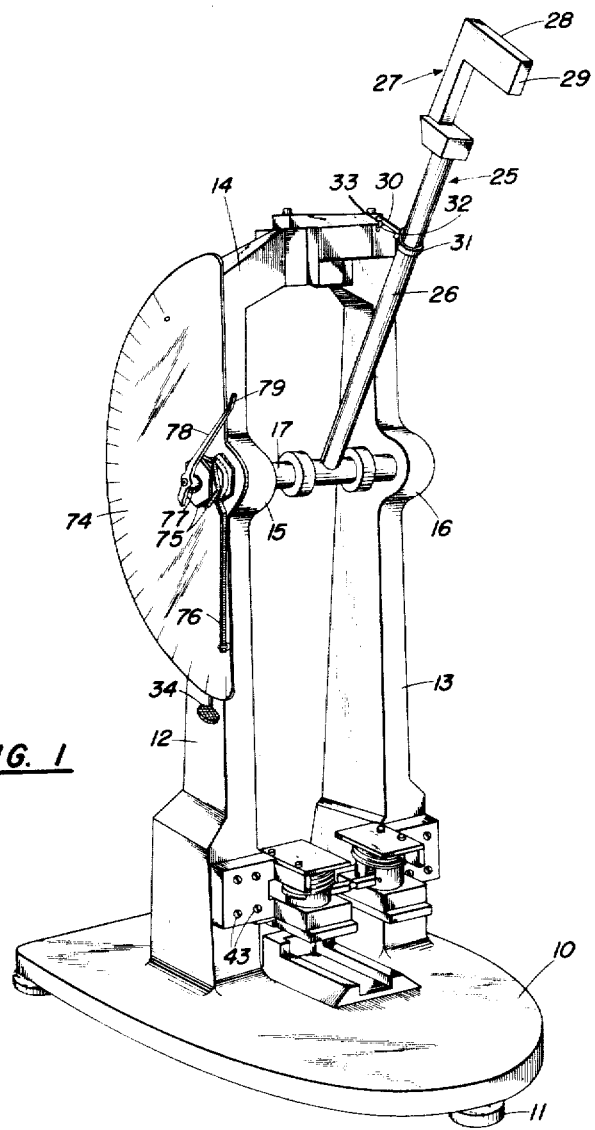
Fig. 1 is a perspective view of the impact tester.

In Fig. 1 is illustrated a known type of impact tester equipped with improvement apparatus for facilitating measurement of impact strength of brittle materials. This tester includes a base plate 10 provided with level adjustment screws 11 and dual standards 12 and 13 joined at the top by cross bar 14. In the upper half of standards 12 and 13 the material curves outwardly at points of equal height above base 10 to form lugs 15 and 16, and in alined openings in these lugs is inserted a rotatable shaft 17.

The impact hammer 25 consists of a straight handle 26 fixedly attached at one end to the center of shaft 17 and a hammer head 27 of approximate U-shape with the outer U-arm 28 projecting beyond and at right angles to the handle surface. The tip end 29 of the arm 28 is normally flat and parallel to the handle axis so that in its downward swing it contacts solidly against the specimen.

To hold the hammer elevated prior to gravity actuation, a hook unit is provided including an arm 30 attached to the handle 26 by a ring 31 and a hook 33 for engaging a retractible member 32 depressible by thumb piece 34 through conventional connections (not shown) on the back of the apparatus. On depression of thumb piece 34 the hammer is released and falls in pivotal movement about the shaft to strike the previously placed work piece in the base area.

Figure 2:
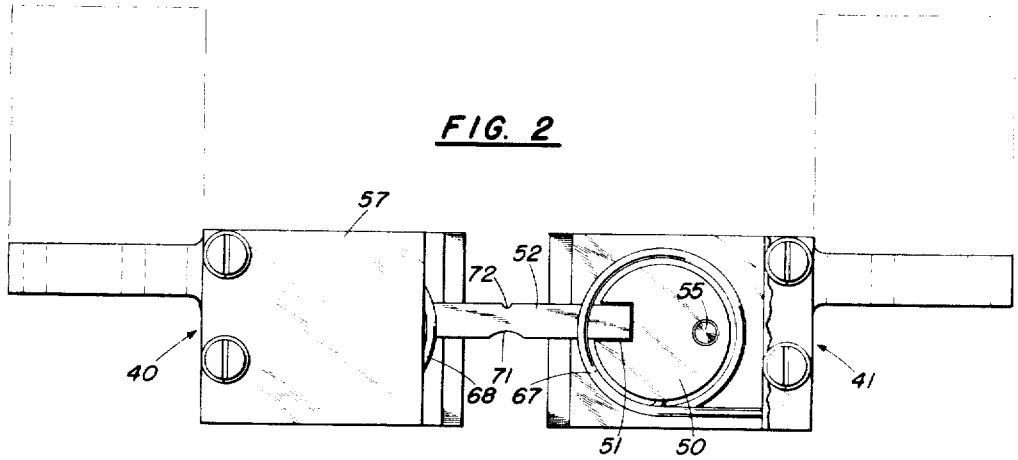
Fig. 2 is a plan view of work piece gripping apparatus.
Figure 3:
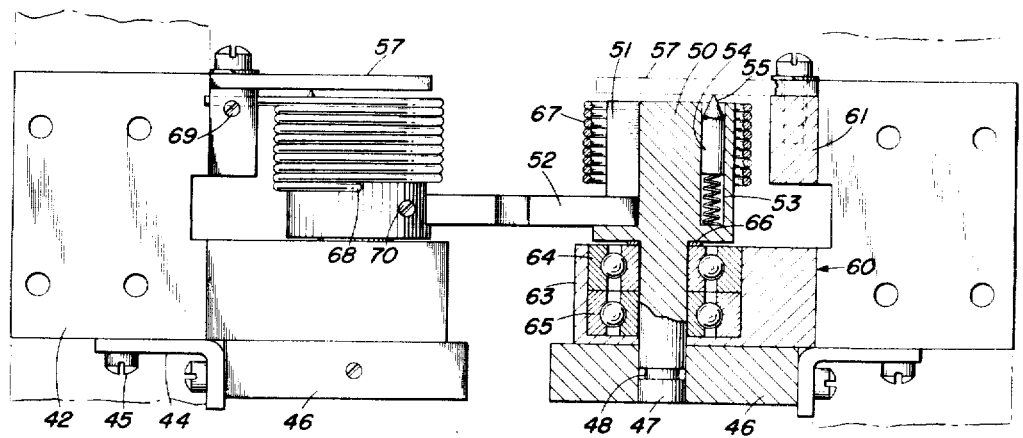
Fig. 3 is a side view of the gripping apparatus with parts in section to show the scriber unit.

The specimen holding apparatus is shown in detail in Figs. 2 and 3. This apparatus consists of two holding units 40 and 41, these units being identical in parts but assembled for opposed positioning with the specimen therein between. Consequently, only one unit need be described, the same reference numbers being used for identical parts.

The unit consists of a holding block 42 secured to the front side of the standard, near the base thereof, by screws 43. To the lower and inner edge of this block, an angle plate 44 is attached by screws 45 and to this angle plate is affixed the support plate 46. Approximately centrally in plate 46, an aperture is formed to receive a shaft 47, grooved at 48 for engagement of a set screw (not shown) for holding the shaft against axial shifting. This shaft is in extension of a solid drum 50 which is axially cut parallel to the drum axis on the drum surface to form a receiving slot 51 for one end of the specimen 52 under test. On the side of the drum opposite to the slot and parallel to the drum axis is a cylindrical recess 53 open at the top exposed drum surface and containing a scriber pin 54 with a pointed tip 55 and a coiled spring 56 between the pin and the base of the recess so that the pin normally is urged outwardly against the surface of stationary scriber plate 57. Plate 57 is supported directly above and closely adjacent to the top of drum 50 by means of an auxiliary support block 60 which rests on the support plate 46. This block 60 is L-shaped with the vertical section 61 resting against the edge of plate 42. The horizontal section 63 is cupped to receive two superposed ball bearings 64 and 65 and an aperture is formed in the cup base in alinement with the aperture in support plate 46. The shaft 47 of drum 50 extends into this cup and through the alined apertures; and the inner rings of each bearing 64 and 65 is fixed to the shaft, the outer fixed bearing rings being nested within the cup. A washer 66 spaces the drum from the stationary bearing sections.

Yielding control of rotation of drum 50 is obtained by means of coil spring 67 which surrounds the drum with one end attached to the side surface thereof, as at 68, and the other end extending tangentially to a recess in support block section 61 where it is held by set screw 69. In accordance with the normal characteristics of coil springs, the angle of rotation of drum 50 will vary directly with the applied load.

The specimen 52 is held in slots 51 by means of set screws in the drums, as indicated at 70 to form specimen grips. As appears from Fig. 2, one edge of each of the slots 51 is approximately radial, so that, when the specimen 52 is in place, one edge of the specimen is approximately coincident with a line joining the centers of rotation of the drums 50. Prior to placement, the specimen which usually is squared axially, is broadly notched at the middle of one side, as at 71 and narrowly notched on the opposite side, as at 72. Also the scriber plates 57 are removed and coated on their inner sides with layout or equivalent ink and the plates then replaced. These plates are also provided with suitable scale markings on the under plate surface, calibrated to give energy values in association with the line markings on the plate as produced by the scriber point 55. It is pointed out that the impact base area of notch 71 lies approximately in the center line between the centers of rotation of the rotary holding drums 50.

Total energy values of specimen fracture are obtained from the scale sector 74 affixed by retaining nuts 75 to the outer side of standard 12 in line with shaft 17 with the straight edge of the sector vertical and on the forward side of the apparatus. The scale markings at the curved edge of the sector start with zero at the top and represent, through appropriate calibration, total energy imparted to the workpiece by the hammer at impact. This energy is determined by the limit of swing of arm 76 which is freely pivoted on an axis common to shaft 17 with a frictional restraint sufficient to hold the pin at any point where it may be moved on the sector scale. Rigidly attached to the outside extension 77 of shaft 17 is a contact arm 78 which is bent inwardly to provide an arm segment 79 which on downward rotation contacts with the pendant arm 76 and moves this arm over the calibrated sector 74 to register total energy of hammer impact on the specimen.

In operation, the hammer is lifted and attached by hook 32 to the depressible ring 33. The specimen is then inserted and fixed in slots 51 with the wide slot 71 on the outward side to receive the impact of the hammer head tip 29, and on release of the hammer by thumb piece 34 the hammer breaks the specimen and swings through, carrying the scale arm 76 over the sector dial face by means of contact arm 78 to a point indicative of the total energy absorbed in the specimen fracture. This total energy includes the impact energy and the toss energy, so that to obtain the impact energy it is necessary only to subtract the toss energy from the total energy. The toss energy is read directly from the calibrated scribe plates, the limit of swing of the scriber 54 on the plate being indicative of the toss energy of fracture for each specimen segment. There is thus provided apparatus for determination of impact energy at fracture which is simple in principle and operation as well as accurate. Since the point of impact for the specimen is in the line between drum centers, the component of stress along the specimen is approximately zero, thereby eliminating any tendency for the specimen to slip in the drum grips or the grips to bend and thus to distort the indicator action.

Obviously many modifications and variations of the present invention are possible in the light of the above teachings. It is therefore to be understood that within the scope of the appended claims the invention may be practiced otherwise than as specifically described.

What is claimed is:

1. An impact tester for determination of the total and toss energy expended on fracture of brittle elongated material specimens, comprising a base, an impact hammer mounted on said base for pivotal swinging movement thereabove, means for holding the specimen on said base in position to be impacted by the hammer in its swinging movement including two rotatable drums each provided with a peripheral specimen grip having a guide edge approximately radial with reference to the drum center whereby one edge of a specimen when positioned in said grips lies on the line between the drum centers of rotation, means connected to said hammer for indicating the total energy of specimen fracture, means connected to said specimen holding means for indicating the toss energy due to specimen fracture, and resilient means for holding said drums normally in position to receive the specimen and to restore said drums after toss rotation to normal specimen receiving position.

2. An impact tester for determination of the total and toss energy expended on fracture of brittle elongated material specimens, comprising a base, spaced upright standards secured to said base, a hammer mounted on said standards for pivotal movement therebetween, a workpiece specimen support positioned adjacent the base ends of each of said standards including two rotatable drums each provided with a peripheral specimen grip having a guide edge approximately radial with reference to the drum center whereby one edge of a specimen when positioned in said grips lies on the line between the drum centers of rotation, means for indicating total specimen strength at hammer impact, means connected to each specimen support for indicating the toss energy developed by specimen fracture and resilient means for holding said drums normally in position to receive the specimen and to restore said drums after toss rotation to normal specimen receiving position, said resilient means having a restoring force on displacement variable directly in accordance with the extent of displacement.

3. An impact tester comprising a support, a holder for specimens to be tested mounted on said support, a freely pivoted hammer adapted for swinging movement against said specimen to fracture the same, means to hold said hammer at a point of maximum potential for swing movement, means for releasing said hammer for impact movement, and a device for indicating total impact energy of said hammer on said specimen, said specimen holder comprising two support units, one mounted on each side of the specimen space, each unit comprising a base element, a shaft vertically mounted on said base, a drum having a specimen end recess mounted for rotation on said shaft, a spring normally holding said drum with the recess in direct line with the recess in the other drum to permit specimen end attachment in said recesses, a scriber fastened to said drum with the scribing end projecting above the drum end, and a flat scriber plate mounted on said support above said drum and in contact with said scriber adapted to receive an impressionable coating whereby on fracture of the specimen after impact by said hammer, the toss energy is measured by said scriber.

4. In an impact tester, a device for measurement of toss energy of a specimen after fracture from impact, comprising a support for said device, two drums each having a specimen gripping recess for holding an end of a specimen to be tested, a shaft projecting from an end of each drum, said shaft being vertically mounted for rotation on said support, springs normally holding each of said drums at one limit of rotatable movement but adapted to yield on specimen fracture to permit drum rotation, a vertically positioned scriber attached to and movable with each of said drums at a point offset from the drum axis of rotation, the scribing end thereof projecting beyond the end of the drum, and two scriber plates adapted to receive an impressionable coating one one face thereof and each mounted on said support over one of said drums with the coating face horizontal and engaging said scriber end, whereby on rotation of said drums on specimen fracture a measure of toss energy is indicated on said plates.

5. An impact tester for brittle elongated material specimens, comprising a base, an impact hammer mounted on said base for pivotal swinging movement thereabove, means for holding the specimen on said base in position to be impacted by the hammer in its swinging movement, means connected to said hammer for indicating the total energy of specimen fracture, and resilient means connected to said specimen holding means for indicating the toss energy due to specimen fracture, including two revolvable drums each having an attachment device for one end of said specimen, spring devices for holding said drums normally in position to receive the specimen in said attachment devices, a scriber pin attached to each of said drums at a point displaced from its axis of revolution for circular movement with said drums on revolution thereof, a stationary scriber plate mounted adjacent each of said drums and in contact with the drum pin adapted for surface marking on rotation of said pin, and a scale on each scriber plate adjacent said scriber plate marking, the center line between the centers of rotation of the drums lying along an edge of the specimen forming the area of impact between the hammer and specimen.

References Cited in the file of this patent

UNITED STATES PATENTS

| 403,676 | Keep | May 21, 1889 |
|---|---|---|
| 2,477,908 | Stock | Aug. 2, 1949 |

FOREIGN PATENTS

| 129,422 | Great Britain | July 8, 1919 |

U. S. DEPARTMENT OF COMMERCE
PATENT OFFICE

CERTIFICATE OF CORRECTION

Patent No. 2,778,219                                            January 22, 1957

William J. Wachter

It is hereby certified that error appears in the printed specification of the above numbered patent requiring correction and that the said Letters Patent should read as corrected below.

Column 4, line 41, for "one one face" read --on one face--.

Signed and sealed this 1st day of April 1958.

(SEAL)
Attest:
KARL H. AXLINE

Attesting Officer

ROBERT C. WATSON
Commissioner of Patents